United States Patent
Maze et al.

(10) Patent No.: US 11,853,351 B2
(45) Date of Patent: Dec. 26, 2023

(54) METHOD AND APPARATUS FOR ENCAPSULATING PANORAMA IMAGES IN A FILE

(71) Applicant: CANON KABUSHIKI KAISHA, Tokyo (JP)

(72) Inventors: Frédéric Maze, Langan (FR); Franck Denoual, Saint Domineuc (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/620,627

(22) PCT Filed: Jun. 10, 2020

(86) PCT No.: PCT/EP2020/066017
§ 371 (c)(1),
(2) Date: Dec. 17, 2021

(87) PCT Pub. No.: WO2020/260014
PCT Pub. Date: Dec. 30, 2020

(65) Prior Publication Data
US 2022/0245190 A1    Aug. 4, 2022

(30) Foreign Application Priority Data

Jun. 26, 2019 (GB) .................................. 1909192

(51) Int. Cl.
*G06F 16/55* (2019.01)
*G06F 16/51* (2019.01)

(52) U.S. Cl.
CPC .............. *G06F 16/55* (2019.01); *G06F 16/51* (2019.01)

(58) Field of Classification Search
CPC ..... G06F 16/55; G06F 16/51; H04N 21/8153; H04N 21/83; H04N 21/845; H04N 21/85406

(Continued)

(56) References Cited

U.S. PATENT DOCUMENTS

| | | | |
|---|---|---|---|
| 7,996,878 B1 * | 8/2011 | Basso ................ | H04N 21/8153 725/23 |
| 2003/0163477 A1 * | 8/2003 | Visharam ......... | H04N 21/64792 |

(Continued)

FOREIGN PATENT DOCUMENTS

| | | | | |
|---|---|---|---|---|
| AU | 2014340056 B2 * | 4/2019 | ............... | G06T 1/00 |
| WO | WO-2007011836 A2 * | 1/2007 | ......... | G11B 27/3027 |

(Continued)

OTHER PUBLICATIONS

Frederick Maze, Signaling of logically grouped image shots in HEIF, International Organisation for Standardization ISO/IEC JTC1/SC29/WG11 Coding of Moving Pictures and Audio, ISO/IEC/SC29/WG11 MPEG2018/m42564, XP30070903A, Apr. 2018. (Year: 2018).*

(Continued)

*Primary Examiner* — Phuong Thao Cao
(74) *Attorney, Agent, or Firm* — Canon U.S.A., Inc. IP Division

(57) ABSTRACT

A method of encapsulation media data in a file, wherein the method comprises: encoding a set of reference images; generating a set of image items to describe the set of reference images; generating an image item describing a derived image corresponding to a panorama based on the set of reference images; generating an association information that associates the image item describing the derived image with the set of image items; generating a parameter data structure containing parameters of the panorama, the parameter data structure being associated with the image item describing the derived image; and embedding the set of image items, the image item describing the derived image, and the association information in the file.

22 Claims, 6 Drawing Sheets

(58) Field of Classification Search
USPC .......................................................... 707/737
See application file for complete search history.

(56) References Cited

U.S. PATENT DOCUMENTS

| | | | |
|---|---|---|---|
| 2004/0167925 A1* | 8/2004 | Visharam | H04N 21/8451 |
| 2006/0051057 A1* | 3/2006 | Nakagawa | H04N 9/8205 |
| | | | 386/318 |
| 2006/0233247 A1* | 10/2006 | Visharam | H04N 19/40 |
| | | | 375/E7.199 |
| 2016/0234144 A1* | 8/2016 | Hannuksela | H04N 19/00 |
| 2016/0373777 A1* | 12/2016 | Pettersson | H04N 19/46 |
| 2017/0111642 A1* | 4/2017 | Hendry | H04N 19/30 |
| 2018/0007407 A1 | 1/2018 | Maze et al. | |
| 2018/0261254 A1* | 9/2018 | Wang | H04N 21/4728 |
| 2018/0277164 A1* | 9/2018 | Wang | H04N 21/84 |
| 2020/0021883 A1* | 1/2020 | Stockhammer | H04N 21/435 |
| 2020/0221063 A1* | 7/2020 | Kammachi Sreedhar | |
| | | | H04N 21/85406 |
| 2021/0160587 A1* | 5/2021 | Aksu | H04N 21/8153 |
| 2021/0201855 A1* | 7/2021 | Kammachi-Sreedhar | |
| | | | H04N 13/183 |
| 2022/0150296 A1* | 5/2022 | Hannuksela | H04L 65/75 |

FOREIGN PATENT DOCUMENTS

| | | | | |
|---|---|---|---|---|
| WO | WO-2018177819 A1 * | 10/2018 | ............. | H04N 19/46 |
| WO | WO-2018182144 A1 * | 10/2018 | ............. | H04L 67/02 |
| WO | 2019/072795 A1 | 4/2019 | | |
| WO | WO-2019197718 A1 * | 10/2019 | ............. | G06F 16/51 |

OTHER PUBLICATIONS

Frederick Maze, Signaling of logically grouped image shots in HEIF, International Organisation for Standardization ISO/IEC JTC1/SC29/WG 11 Coding of Moving Pictures and Audio, ISO/IEC JTC1/SC29/WG11 MPEG2018/m42564, XP30070903A, Apr. 2018.
Herve Ruellan, [HEIF] Support for Bracketing, International Organisation for Standardization ISO/IEC JTC1/SC29/WG 11 Coding of Moving Pictures and Audio, ISO/IEC JTC1/SC29/WG11 MPEG2018/M44838, XP30192113A, Oct. 2018.

* cited by examiner

METHOD AND APPARATUS FOR ENCAPSULATING PANORAMA IMAGES IN A FILE

CROSS REFERENCE TO RELATED APPLICATION

This application is the National Phase application of PCT Application No. PCT/EP2020/066017, filed on Jun. 10, 2020 and entitled "METHOD AND APPARATUS FOR ENCAPSULATING PANORAMA IMAGES IN A FILE". This application claims the benefit under 35 U.S.C. § 119(a)-(d) of United Kingdom Patent Application No. 1909192.5, filed on Jun. 26, 2019. The above cited patent applications are incorporated herein by reference in their entirety.

The present disclosure concerns a method and a device for encapsulating multiple images in a file.

Modern cameras provide different capture modes to capture images. Some of these capture modes result in capturing series of images. For example, they offer bracketing modes where several images are captured, the value of one parameter of the capture varying from one capture image to another. The parameter may be the exposure time, the value of the white, or the focus, for example. Another capture mode can be panorama mode that allows obtaining a series of overlapping images to reconstitute a large view of a scene. Modern cameras are able to combine these different capture modes, for example, for each captured view for building a panorama, they are able to capture series of images according to a bracketing mode. For instance, this allows creating High Dynamic Range (HDR) panorama by capturing auto-exposure bracketing of images for each view that will compose the panorama. Another example is creating focus stacked panorama by capturing focus bracketing of images for each view that compose the panorama.

Images captured by a camera are stored on a storage device like a memory card, for example. The images are typically encoded to reduce the size of data on the storage device. Many encoding standards may be used, like JPEG or the more recent HEVC standard.

The HEVC standard defines a profile for the encoding of still images and describes specific tools for compressing single still images or sequence of still images. An extension of the ISO Base Media File Format (ISOBMFF) used for such kind of image data has been proposed for inclusion into the ISO/IEC 23008 standard, in Part 12, under the name: "HEIF or High Efficiency Image File Format".

HEIF (High Efficiency Image File Format) is a standard developed by the Moving Picture Experts Group (MPEG) for storage and sharing of one or more images and image sequences.

The MIAF (Multi-Image Application Format) is a standard developed by MPEG into ISO/IEC 23000 standard part 22 that defines a set of constraints on HEIF specification to precise interoperability points for creation, reading, parsing and decoding of images embedded in the High Efficiency Image File (HEIF) format.

The HEIF and MIAF file formats do not provide an efficient way of storing the panorama.

The HEIF and MIAF file formats do not provide an efficient way of storing human-readable textual descriptions of images or group of images (including panorama).

The HEIF and MIAF file formats do not provide an efficient way of storing timing information for images and group of images (including for panorama).

The present invention has been devised to address one or more of the foregoing concerns. It concerns the description of a panorama as a derived image.

According to an aspect of the invention, it is proposed a method of encapsulation media data in a file, wherein the method comprises:
  encoding a set of reference images;
  generating a set of image items to describe the set of reference images;
  generating an image item describing a derived image corresponding to a panorama based on the set of reference images;
  generating an association information that associates the image item describing the derived image with the set of image items;
  generating a parameter data structure containing parameters of the panorama, the parameter data structure being associated with the image item describing the derived image;
  embedding the set of image items, the image item describing the derived image, and the association information in the file.

According to an embodiment, the method further comprises:
  generating a parameter data structure containing parameters of the panorama, the parameter data structure being associated with the image item describing the derived image; and
  embedding the parameter data structure in the file.

According to an embodiment:
  the image item describing the derived image is a derived image item;
  the derived image item has a dedicated item type indicating that the derived image item is a panorama;
  the parameter data structure is stored in a media part of the file.

According to an embodiment:
  the method further comprises encoding the derived image corresponding to the panorama, the encoded derived image being stored in a media part of the file;
  the image item describing the derived image is a pre-derived coded image item; and
  the parameter data structure is stored as an item property associated with the pre-derived coded image item.

According to an embodiment, the parameter data structure comprises a panorama direction.

According to an embodiment, the parameter data structure further comprises a number of rows and columns.

According to an embodiment, the parameter data structure comprises the size of the derived image corresponding to the panorama.

According to an embodiment, the parameter data structure comprises a type indication of the type of derivation.

According to an embodiment, at least some of the image items in the set of image items constitute a group of image items.

According to an embodiment, at least some of the image items are associated with an item property comprising at least one human readable label.

According to an embodiment, at least some of the image items are associated with an item property comprising a timing information.

According to another aspect of the invention, it is proposed a method of reading media data in a file, wherein the method comprises:

reading an image item describing a derived image corresponding to a panorama based on the set of reference images;
reading an association information that associates the image item describing the derived image with the set of image items;
reading a set of image items that describe a set of reference images;
obtaining the derived image corresponding to the panorama.

According to an embodiment, the method further comprises:
reading a parameter data structure containing parameters of the panorama, the parameter data structure being associated with the image item describing the derived image;

According to an embodiment:
the image item describing the derived image is a derived image item;
the derived image item has a dedicated item type indicating that the derived image item is a panorama;
the parameter data structure is stored in a media part of the file.

According to an embodiment:
the method further comprises decoding the derived image corresponding to the panorama, the encoded derived image being stored in a media part of the file;
the image item describing the derived image is a pre-derived coded image item; and
the parameter data structure is stored as an item property associated with the pre-derived coded image item.

According to an embodiment, the parameter data structure comprises a panorama direction.

According to an embodiment, the parameter data structure further comprises a number of rows and columns.

According to an embodiment, the parameter data structure comprises the size of the derived image corresponding to the panorama.

According to an embodiment, the parameter data structure comprises a type indication of the type of derivation.

According to an embodiment, at least some of the image items in the set of image items constitute a group of image items.

According to another aspect of the invention, it is proposed a device for encapsulation media data in a file, wherein the device comprises circuitry configured for:
encoding a set of reference images;
generating a set of image items to describe the set of reference images;
generating an image item describing a derived image corresponding to a panorama based on the set of reference images;
generating an association information that associates the image item describing the derived image with the set of image items;
embedding the set of image items, the image item describing the derived image, and the association information in the file.

According to another aspect of the invention, it is proposed a device for reading media data in a file, wherein the device comprises circuitry configured for:
reading an image item describing a derived image corresponding to a panorama based on the set of reference images;
reading an association information that associates the image item describing the derived image with the set of image items;
reading a set of image items that describe a set of reference images;
obtaining the derived image corresponding to the panorama.

According to another aspect of the invention, it is proposed a computer program product for a programmable apparatus, the computer program product comprising a sequence of instructions for implementing a method according to the invention, when loaded into and executed by the programmable apparatus.

According to another aspect of the invention, it is proposed a computer-readable storage medium storing instructions of a computer program for implementing a method according to the invention.

According to another aspect of the invention, it is proposed a computer program which upon execution causes the method of the invention to be performed.

At least parts of the methods according to the invention may be computer implemented. Accordingly, the present invention may take the form of an entirely hardware embodiment, an entirely software embodiment (including firmware, resident software, microcode, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer-readable code for provision to a programmable apparatus on any suitable carrier medium. A tangible, non-transitory carrier medium may comprise a storage medium such as a floppy disk, a CD-ROM, a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g., a microwave or RF signal.

Embodiments of the invention will now be described, by way of example only, and with reference to the following drawings in which.

The HEVC standard defines a profile for the encoding of still images and describes specific tools for compressing single still images or sequences of still images. An extension of the ISO Base Media File Format (ISOBMFF) used for such kind of image data has been proposed for inclusion into the ISO/IEC 23008 standard, in Part 12, under the name: "HEIF or High Efficiency Image File Format".

The HEIF and MIAF standards cover two forms of storage corresponding to different use cases:

the storage of image sequences, each image being represented by a sample with timing information that is optionally used at the decoder, and in which the images may be dependent on other images, and the storage of single images, and collections of independently coded images.

In the first case, the encapsulation is close to the encapsulation of the video tracks in the ISO Base Media File Format (see document «Information technology—Coding of audio-visual objects—Part 12: ISO base media file format», ISO/IEC 14496-12:2015, Fifth edition, December 2015), and the similar tools and concepts are used, such as the file-level 'moov' box, 'trak' boxes (encapsulated in the 'moov' box) and the sample grouping for description of samples and group of samples. A sample denotes all timed data associated with a single time (e.g., a frame in a video or an image in an image sequence).

Boxes, also called containers, are metadata structures provided to describe the data in the files. Boxes are object-oriented building block defined by a unique type identifier (typically a four-character code, also noted FourCC or 4CC) and length. All data in a file (media data and metadata describing the media data) is contained in boxes. There is no other data within the file. File-level boxes are boxes that are not contained in other boxes.

The 'moov' box is a file format box that contains 'trak' sub boxes, each 'trak' box describing a track, that is to say, a timed sequence of related samples.

In the second case, a set of ISOBMFF boxes, the file-level 'meta' box and its sub boxes are used. These boxes and their hierarchy offer fewer description tools than the 'track-related' boxes ('trak' box hierarchy) and relate to "information items" or "items" instead of related samples. It is to be noted that the wording 'box' and the wording 'container' may be both used with the same meaning to refer to metadata structures that contain metadata describing the organization or/and properties of the image data in the file. The same wording 'box' and the wording 'container' may also be both used with the same meaning to refer to metadata structures that contain the image data in the file (e.g. 'mdat' or 'idat' boxes).

Figure 1:
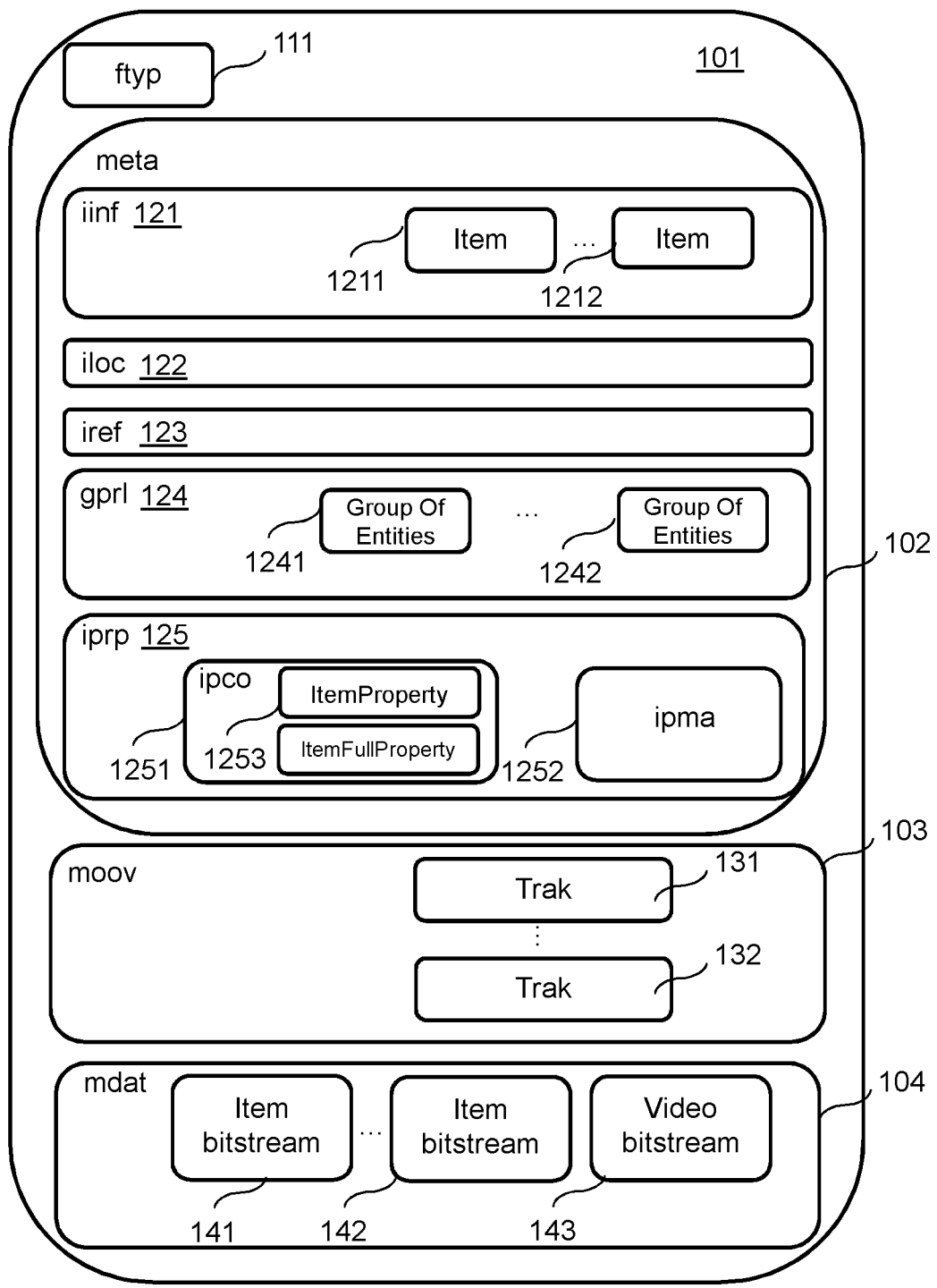
FIG. 1 illustrates an example of an HEIF file that contains several images or sequences of images.

FIG. 1 illustrates an example of an HEIF file 101 that contains media data like one or more still images and possibly video or sequence of images. This file contains a first 'ftyp' box (FileTypeBox) 111 that contains an identifier of the type of file (typically a set of four character codes). This file contains a second box called 'meta' (MetaBox) 102 that is used to contain general untimed metadata including metadata structures describing the one or more still images. This 'meta' box 102 contains an 'iinf' box (ItemInfoBox) 121 that describes several single images. Each single image is described by a metadata structure ItemInfoEntry also denoted items 1211 and 1212. Each item has a unique 32-bit identifier item_ID. The media data corresponding to these items is stored in the container for media data, the 'mdat' box 104. An 'Hoc' box (ItemLocationBox) 122 provides for each item the offset and length of its associated media data in the 'mdat' box 104. An 'iref' box (ItemReferenceBox) 123 may also be defined to describe the linking of one item to others via typed references.

Optionally, for describing the storage of image sequences or video, the HEIF file 101 may contain a third box called 'moov' (MovieBox) 103 that describes several image sequences or video tracks 131 and 132. Typically, the track 131 is an image sequence ('pict') track designed to describe a set of images for which the temporal information is not necessarily meaningful and 132 is a video ('vide') track designed to describe video content. Both these tracks describe a series of image samples, an image sample being a set of pixels captured at the same time, for example a frame of a video sequence. Main difference between the two tracks is that in 'pict' tracks the timing information is not necessarily meaningful whereas for 'vide' track the timing information is intended to constraint the timing of the display of the samples. The data corresponding to these samples is stored in the container for media data, the 'mdat' box 104.

The 'mdat' container 104 stores the untimed encoded images corresponding to items as represented by the data portions 141 and 142 and the timed encoded images corresponding to samples as represented by the data portion 143.

An HEIF file 101 offers different alternatives to store multiple images. For instance, we may store the multiple images either as items or as a track of samples that can be a 'pict' track or a 'vide' track. The actual choice is typically made by the application or device generating the file according to the type of images and the contemplated usage of the file.

The HEIF standard also provides some mechanisms designed to specify properties associated to images, in particular some metadata structures to declare or store properties for images and more generally for items (of any kind of media types). Typically, the 'meta' box 102 may contain an 'iprp' box (ItemPropertiesBox) 125 that enables the association of any item with an ordered set of item properties. This 'iprp' box 125 contains an 'ipco' box (ItemPropertyContainerBox) 1251 that is a property container data structure that contains all property data structures (ItemProperty and ItemFullProperty) 1253 describing properties of all items described in the HEIF file. The 'iprp' box also contains a set of 'ipma' box (ItemPropertyAssociationBox) 1252, which are association data structures that actually associate one or more item properties with a given item. It is then possible to associate a same property with several items.

In addition, ISO Base Media File Format specifies a grouping mechanism adapted for the grouping of items and/or tracks. The 'meta' box 102 may contain a container box 'gprl' (GroupsListBox) 124 that may contain a set of metadata structures describing groups of entities 1241 and 1242 that all inherit from a grouping data structure called EntityToGroupBox (also denoted entity group) defined as follows:

```
aligned(8) class EntityToGroupBox(grouping_type, version, flags)
   extends FullBox(grouping_type, version, flags) {
      unsigned int(32) group_id;
      unsigned int(32) num_entities_in_group;
      for(i=0; i<num_entities_in_group; i++)
         unsigned int(32) entity_id;
   // the remaining data may be specified for a particular
   grouping_type
}
```

Where the group_id is a unique identifier of the group of entities, unique in this case must be understood as unique within the file. It shall not be equal to any group_id value of any EntityToGroupBox, any item_ID value of the hierarchy level (file, movie, or track) that contains the GroupsListBox or any track_ID value (when the GroupsListBox is contained in the file level). Then, the list of entity_id gives the identifier of all the entities pertaining to the group.

In this mechanism, the wording 'entity' is used to refer to items (any type of items, e.g., image or metadata items) or tracks (e.g., video track 'vide', sequence of images track 'pict', audio track, or any other type of tracks), and a grouping_type is used to specify the type of grouping. HEIF actually defines a limited number of grouping_type values.

ISO Base Media File Format also specifies a grouping mechanism adapted for the grouping of samples within a track.

This mechanism relies on two dedicated boxes. A first box named SampleToGroupBox allows associating one or more samples to one or more group descriptions. A second box named SampleGroupDescriptionBox comprises one or more sample group description entries providing alternative description of properties for groups of samples. When these two boxes are declared with same grouping_type, they respectively provide the association of samples with one of the group description entries, and the list of alternative group description entries for a given type of group of samples identified by a common grouping_type.

The invention provides a mechanism that provides a mean for describing a group of items captured or edited to form a panorama. It is provided a mean to describe the capture or collection mode that has been used. According to some embodiments, some additional information or properties regarding the capture may be described in relation with the entities or the group of entities.

The standard provides the notion of derived image. A derived image is an image that results from a derivation based on one or several reference images. There are two different types of derived image in the standard. A first one is the derived image item where the image item is linked to a set of reference images. The derived image item does not comprise image data in the media part of the file. Instead of image data, the media data part may comprise some parameters to be used in the derivation process. The second type of derived image is the pre-derived coded image item. The pre-derived coded image item is also linked to a set of reference images. The difference between the pre-derived coded image item and the derived image item is mainly that the pre-derived coded image item comprises the image data resulting from the derivation in the media part of the file. A player that needs access to a derived image needs to perform the derivation based on the reference images in the case of a derived image item while the derived image is directly accessible in a pre-derived coded image item. The standard currently contemplates the derived images to store a grid of images and overlay images. It is herein proposed solutions to describe panorama images as derived images. A first embodiment is based on the derived image item while a second one is based on the pre-derived coded image item. According to the proposed solutions, a panorama is represented by an item in the file. One advantage of using an item to describe a panorama is that it allows designating the panorama as a primary item in a HEIF file (via the PrimaryItemBox 'pitm'), i.e., designating the panorama as the default item that is intended to be rendered by a HEIF reader.

A third embodiment describes panorama images as a group of reference images.

According to a first embodiment, the panorama is described as a derived image item. An item is a derived image item, when it includes a 'dimg' item reference to one or more other image items, which are inputs to the derivation. A derived image does not contain media data representing a coded image bitstream in itself, but the reconstructed image representing the derived image item is obtained by performing an operation on one or more input images (coded images or other derived images). The exact operation performed to obtain the reconstructed image is identified by the item_type of the item.

According to this embodiment, an item with an item_type value of 'pano' defines a derived image item by overlapping and stitching one or more input images in a given order to obtain a higher resolution panorama. The input images are listed in scan-order in the SingleItemTypeReferenceBox of type 'dimg' for this derived image item within the ItemReferenceBox.

On contrary to grid derived image item (item_type='grid'), the panorama derived image item does not mandate that input images shall have a consistent size without overlap. And on contrary to overlay derived image (item_type='iovl'), the panorama derived image item signals that derivation operation implies additional processing steps for stitching input images and correcting alignments and deformations in panorama. Moreover, the scan order of input images matches the capture order performed by the user and thus avoid to reorder images before encapsulating them in a HEIF file.

The parameters associated with the panorama, as the panorama direction, may be stored, if needed, in the media data part of the file associated with the derived image item. These media data associated with the panorama derived image item (or body of the item) may be described as follows in a parameter data structure:

```
aligned(8) class ImagePanorama {
    unsigned int(8) version = 0;
    unsigned int(8) flags = 0;
    unsigned int(8) panorama_direction;
    if (panorama_direction >= 4 && panorama_direction <= 5) { // grid
        unsigned int(8) rows_minus_one;
        unsigned int(8) columns_minus_one;
    }
}
```

Where

Version and flags shall be equal to 0. Both attributes are defined to support future extensions of panorama derived image item. Version parameter can be used to define new syntax attributes conditionally to the value of the version parameter, and flags parameter may allow defining a map of flags to signal/activate optional features or parameters conditionally to the value of this flags parameter.

panorama_direction is an unsigned integer, for example on 8 bits, signaling the type of panorama used and the scanning order of input images in the panorama:
  0: left-to-right horizontal panorama
  1: right-to-left horizontal panorama
  2: bottom-to-top vertical panorama
  3: top-to-bottom vertical panorama
  4: grid panorama in raster scan order, i.e., rows and columns are organized from left-to-right and top-to-bottom starting from the top-left corner.
  5: grid panorama in continuous order, i.e., starting from the top-left corner, the first row is organized from left-to-right, then the second row is organized from right-to-left, the third row is organized from left-to-right and so on.
  other values are undefined.

rows_minus_one is an unsigned integer that specifies the number of rows in the grid minus one.

columns_minus_one is an unsigned integer that specifies the number of columns in the grid minus one. In an embodiment, this parameter does not exist and the number of columns is computed from the total number of input images and the number of rows.

When no parameter data structure is present in the media file, it is assumed an horizontal left to right panorama.

In alternatives, additional values of panorama_direction may be defined to support grid panorama in raster scan or continuous scan orders starting from a different corner (e.g., top-right, bottom-left or bottom-right corners). For instance, starting from bottom-right corner, the raster scan order would be organized for each row from right-to-left and bottom-to-top, and the continuous scan order would start from the last row from right-to-left and then from left-to-right on the upper row and so on.

In a variant, the media data associated with the panorama derived image item may be defined as follows:

```
aligned(8) class ImagePanorama {
    unsigned int(8) version = 0;
    unsigned int(8) flags;
    FieldLength = ((flags & 1) + 1) * 16;
    unsigned int(FieldLength) output_width;
    unsigned int(FieldLength) output_height;
    unsigned int(8) panorama_direction;
    if (panorama_direction >= 4 && panorama_direction <= 5) { // grid
        unsigned int(8) rows_minus_one;
        unsigned int(8) columns_minus_one;
    }
}
```

Where

Two additional parameters and a flag are defined to signal the size of the reconstructed panorama image.

(flags & 1) equal to 0 specifies that the length of the fields output_width, output_height is 16 bits. (flags & 1) equal to 1 specifies that the length of the fields output_width, output_height is 32 bits. The values of flags greater than 1 are reserved.

output_width, output_height specifies the width and height, respectively, of the reconstructed panorama image.

In alternative, the width and height of the reconstructed panorama image can be signaled by associating an ImageSpatialExtentsProperty (with 4CC 'ispe') with the panorama derived image item (via the ItemPropertyAssociationBox ('ipma')).

According to an embodiment, the capture of images for panorama is combined with another bracketing mode, for instance with auto-exposure bracketing to create High Dynamic Range (HDR) panorama, or focus bracketing to create focus staked panorama, or any other types of bracketing mode. Accordingly, the panorama derived image item may include a 'dimg' item reference to one or more group of entities which are inputs to the derivation (e.g., EntityToGroupBox with grouping type 'aebr' for auto-exposure bracketing, or grouping type 'fobr' for focus bracketing, etc. as a group of entities defined in Working Draft of Amendment to ISO/IEC 23008-12, w18430, April 2019).

To include a 'dimg' item reference to one or more groups, the definition of the existing SingleItemTypeReferenceBox may be extended so that the existing attribute to_item_ID can also refer to the group_id of group of entities. The attribute to_item_ID may be renamed into to_item_or_group_ID and defined as follows:

```
aligned(8) class SingleItemTypeReferenceBox(referenceType)
extends Box(referenceType) {
    unsigned int(16) from_item_ID;
    unsigned int(16) reference_count;
    for (j=0; j<reference_count; j++) {
        unsigned int(16) to_item_or_group_ID;
    }
}
``` where reference_type contains an indication of the type of the reference from_item_ID contains the item_ID of the item that refers to other items reference_count is the number of references to_item_or_group_ID contains the item_ID of the item or the group_id of the entity group referred to.

For each view that composes the panorama, an EntityToGroupBox with the grouping type identifying the bracketing mode is defined to describe the bracketing set of images corresponding to this view. In addition, an item property corresponding to the bracketing mode (e.g., AutoExposureProperty or FocusProperty, etc.) may be associated with each image item to specify the properties of the bracketing for this image item (e.g., the exposure value stop of the image item).

Figure 2:
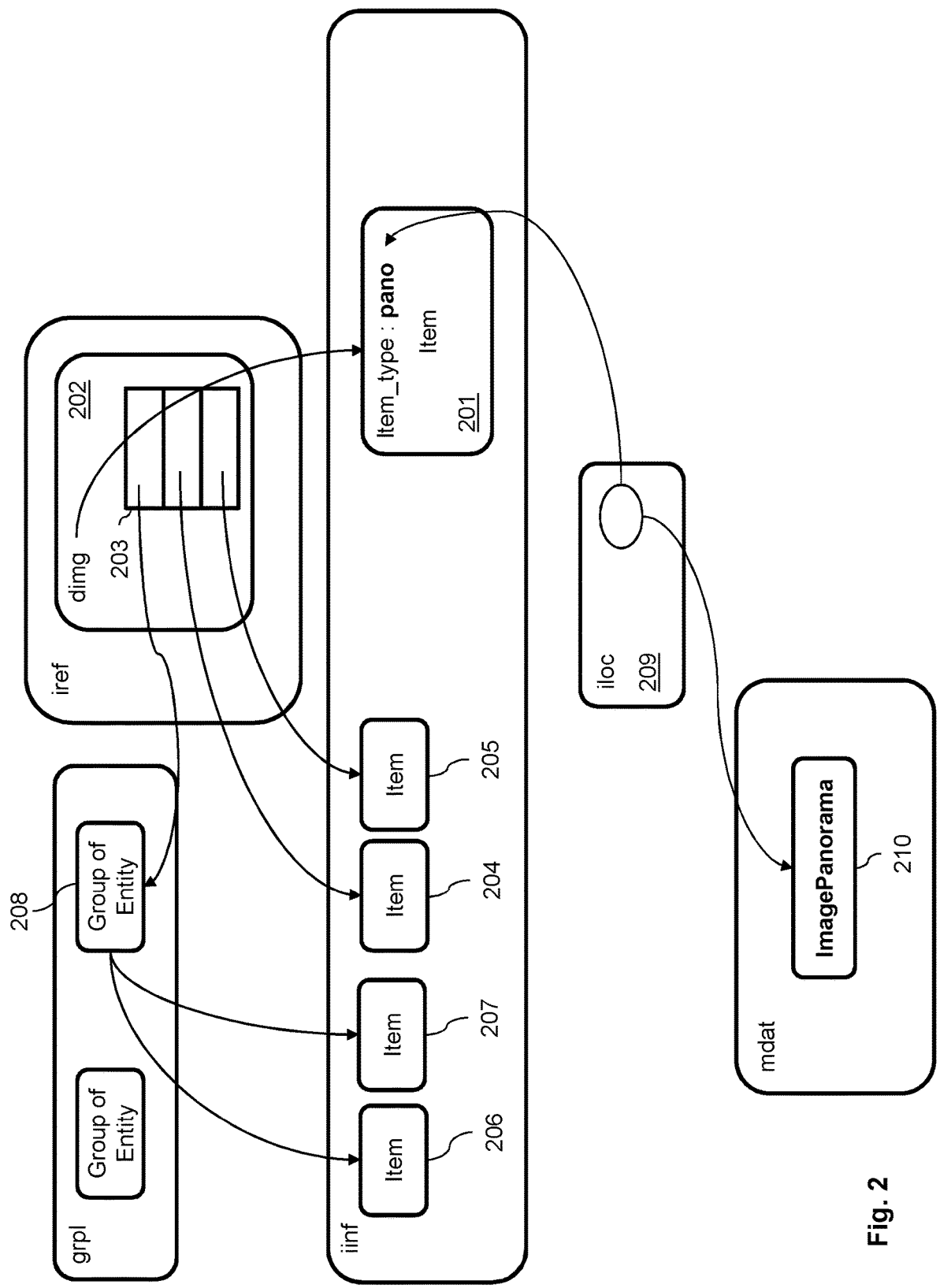
FIG. 2 illustrates the storage of a panorama in a derived image item according to an embodiment of the invention.

FIG. 2 illustrates an example of this first embodiment.

The panorama is represented by a derived image item 201. A new item type is proposed to identify the derived image item as a panorama, for example 'pano'.

In the 'iref' box, a structure SingleItemTypeReferenceBox of reference type 'dimg' 202 contains the list of the reference images 204 and 205 and a reference to a group of images, for example a bracketing set, 208. The group of images itself contains the reference of the image items 206 and 207 composing the group. It is to be noted that a 'dimg' box may reference only items, only group of entities, or a mix of items and group of entities.

The derived image item 201 representing the panorama may be linked via the 'iloc' box 209 to an optional structure 210 in the media data. This structure 210 in the media data does not comprise any image data according to the general derived image item properties. It contains some parameters for the derivation of the panorama, typically the imagePanorama box as above described.

One characteristic of the first embodiment is that a derived image item describes the derivation operations (here to build a panorama) to be applied on a set of input image items, but the resulting reconstructed image is not actually stored in the HEIF file and shall be reconstructed each time a HEIF reader processes the HEIF file.

According to a second embodiment, the panorama is described as a pre-derived coded image item. An item is a pre-derived coded image item, when it designates a coded image bitstream actually stored in the HEIF file and it also includes a 'base' item reference to one or more other image items it derives from. Current HEIF standard does not allow describing the exact derivation process used to produce a pre-derived coded image item. Therefore, for instance, it is not possible to differentiate a pre-derived coded image item representing a panorama from a pre-derived coded image item representing an HDR image.

According to the proposed embodiment, an optional item property DerivationOperationProperty may be defined as follows and associated with the pre-derived item to describe the derivation operation applied to input image items. It is to be noted that the proposed item property may be used to define the derivation operation of any kind of pre-derived coded image item, not only a panorama.

Box type: 'dopr'
Property type: Descriptive item property
Container: Item PropertyContainerBox
Mandatory (per item): No
Quantity (per item): Zero or one for a pre-derived coded image The DerivationOperationProperty documents the derivation operation that was applied on the input image items or group of image items to generate the pre-derived coded image item. Input image items or group of image items are ordered in the order they are referenced by the item reference of type 'base' from the pre-derived coded image item.

```
aligned(8) class DerivationOperationProperty
  extends ItemFullProperty('dopr', version=0, flags=0) {
    unsigned int(32) derivation_operation_4cc;
    if (derivation_operation_4cc == 'pano') {
      unsigned int(8) panorama_direction;
      if (panorama_direction >= 4
        && panorama_direction <= 5) { // grid
        unsigned int(8) rows_minus_one;
        unsigned int(8) columns_minus_one;
      }
    }
    // may conditionally contain further parameters below
    // for other types of derivation operation
}
```

Where
derivation_operation_4cc is the four-character code (4CC) of the derivation operation. For example, the following list of derivation operations may be specified:

| Derivation operation | 4cc code |
| --- | --- |
| High Dynamic Range (HDR) | 'hdr ' |
| Focus stacking | 'fost' |
| Flash Exposure stacking | 'afst' |
| Depth of field stacking | 'dost' |
| Panorama | 'pano' |
| Super Resolution stacking | 'sres' |

When the derivation operation is a panorama derivation, additional parameters are provided to characterize the type of panorama.

The parameters panorama_direction, rows_minus_one and columns_minus_one are defined as specified in the first embodiment above.

The DerivationoperationProperty is easily extensible to support further derivation operation four-character codes and parameters.

According to this embodiment, when the capture of images for panorama is combined with another bracketing mode, for instance with auto-exposure bracketing to create High Dynamic Range (HDR) panorama, or focus bracketing to create focus staked panorama, or any other types of bracketing mode, the panorama pre-derived coded image item may include a 'base' item reference to one or more group of entities which were used as inputs to the panorama derivation (e.g., EntityToGroupBox with grouping type 'aebr' for auto-exposure bracketing, or grouping type 'fobr' for focus bracketing, etc. as a group of entities defined in Working Draft of Amendment to ISO/IEC 23008-12, w18430, April 2019). Similarly, to first embodiment above, the SingleGroupTypeReferenceBox may be extended to allow an item to reference to groups of entities. For each view that composes the panorama, an EntityToGroupBox with the grouping type identifying the bracketing mode is defined to describe the bracketing set of images corresponding to this view. The grouping_type of the EntityToGroupBox both specifies the purpose of grouping and implicitly signals the type of the derivation operation which was applied to image items from this group to obtain an intermediate reconstructed image that was used as input to generate the panorama pre-derived coded image. In addition, an item property corresponding to the bracketing mode (e.g., AutoExposureProperty or FocusProperty, etc.) may be associated with each image item pertaining to an EntityToGroupBox to specify the properties of the bracketing for this image item (e.g., the exposure value stop of the image item).

One advantage when the panorama pre-derived coded image item directly includes a 'base' item reference to one or more group of entities is that it avoids declaring a pre-derived coded image item derived from each group of entities and storing the corresponding intermediate reconstructed images in the HEIF file when this is not needed.

According to this embodiment, the width and height of the reconstructed panorama image can be signalled by associating an ImageSpatialExtentsProperty (with 4CC 'ispe') with the panorama pre-derived coded image item (via the ItemPropertyAssociationBox ('ipma')).

Figure 3:
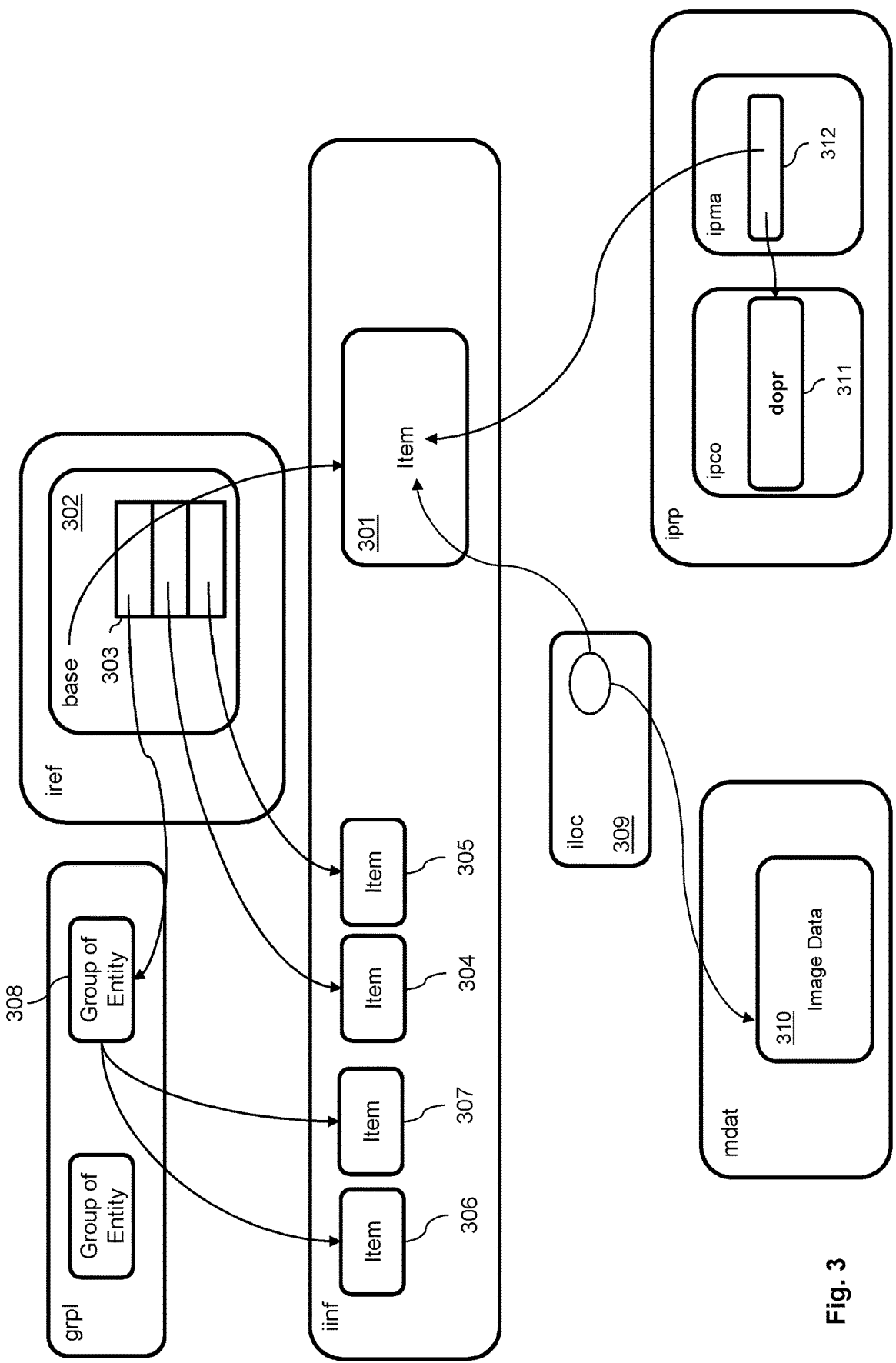
FIG. 3 illustrates the storage of a panorama in a pre-derived coded image item according to another embodiment of the invention.

FIG. 3 illustrates an example of panorama described as a pre-derived coded image item.

The panorama is represented by a pre-derived coded image item 301 with an item_type identifying the coding format of the pre-derived coded image (e.g. 'hvc1' for an image in HEVC coding format or 'jpeg' for an image in JPEG coding format).

In the 'iref' box, a structure SingleItemTypeReferenceBox of reference type 'base' 302 contains the list 303 of the reference images 304 and 305 and a reference to a group of images, for example a bracketing set, 308. The group of images itself contains the reference of the image items 306 and 307 composing the group. It is to be noted that a 'base' box may reference only items, only group of entities, or a mix of items and group of entities.

The pre-derived coded image item 301 representing the panorama is linked via the 'iloc' box 309 to the image data 310 corresponding to the result of the derivation in the media data. The box 311 is an optional item property describing the derivation operation that is linked via the association information 312 in the box 'ipms' to the pre-derived coded image item 301. The box 311 is typically a 'dopr' box as above described.

According to a third embodiment, rather than defining a specific item to describe the panorama, we may only document the relationship between images that composes the panorama. This would not create a panorama object on its own in the HEIF file, but provide enough information a HEIF reader could use to create a panorama.

According to this third embodiment, a new grouping_type 'pano' is defined.

By associating an EntityToGroupBox with the new grouping_type 'pano', the panorama entity group ('pano') indicates a set of images (either stored as items, group of items or samples in a track) that were captured in order to create a panorama. The entity_id of the EntityToGroupBox is extended to be resolved to an item identifier, to a track identifier, or to the identifier (group_id) of an EntityToGroupBox representing a bracketing set of images.

The latter is useful to describe enhanced panorama (e.g., HDR panorama).

The syntax of the EntityToGroupBox may be then defined as follows:

```
aligned(8) class EntityToGroupBox(grouping_type, version,
flags)
    extends FullBox(grouping_type, version, flags) {
        unsigned int(32) group_id;
        unsigned int(32) num_entities_in_group;
        for(i=0; i<num_entities_in_group; i++)
            unsigned int(32) entity_or_group_id;
    // the remaining data may be specified for a particular
    grouping_type
    }
```

Where
entity_or_group_id is resolved to an item, when an item with item_ID equal to entity_or_group_id is present in the hierarchy level (file, movie or track) that contains the GroupsListBox, or to a track, when a track with track_ID equal to entity_or_group_id is present and the GroupsListBox is contained in the file level, or to an entity group, when an entity group with group_id equal to entity_or_group_id is present in same GroupsListBox.

Other parameters keep same definition as previously defined.

In an alternative, a new box is defined to describe group of groups of entities as follows:

```
aligned(8) class GroupToGroupBox(grouping_type, version,
flags)
    extends FullBox(grouping_type, version, flags) {
        unsigned int(32) group_id;
        unsigned int(32) num_groups_in_group;
        for(i = 0; i < num_groups_in_group; i++)
            unsigned int(32) referenced_group_id;
    // the remaining data may be specified for a particular
    grouping_type
    }
```

Where
group_id is a non-negative integer assigned to the particular grouping that shall not be equal to any group_id value of any other GroupToGroupBox and EntityToGroupBox, any item_ID value of the hierarchy level (file, movie. or track) that contains the GroupsListBox, or any track_ID value (when the GroupsListBox is contained in the file level).
num_groups_in_group specifies the number of group_id values mapped to this group of groups.
referenced_group_id is resolved to an entity group, when an entity group with group_id equal to entity_or_group_id is present in same GroupsListBox, or to a group of groups, when a group of groups with group_id equal to entity_or_group_id is present in same GroupsListBox.

In other words, it is proposed a method of encapsulating media data in a file,
wherein the method comprises:
    generating a grouping data structure describing a first group of entities; wherein the grouping data structure comprises association information between the first group of entities and a second group of entities, each entity of the second group being related to at least a portion of media data; and,
    embedding the grouping data structure and the media data in the file.

In an embodiment, the method further comprises
    obtaining a grouping type characterizing a group of entities as being compliant for generating a panorama; and,
    embedding the grouping type in the file.

In an embodiment, each entity of the second group corresponds to at least a portion of the media data.

In an embodiment, each entity of the second group is at least one of: an item, a track, or a third group of entities.

When the grouping_type 'pano' is associated with a GroupToGroupBox, the panorama group-to-group ('pano') indicates a set of images (stored as groups of items, each group of items representing a bracketing set) that were captured in order to create a panorama.

In an alternative to directly reference group of entities in the EntityToGroupBox structure by extending the definition of entity_id or by defining a new box GroupToGroupBox, the ItemReferenceBox('iref') may be extended with a new box SingleGroupTypeReferenceBox dedicated to group-to-group referencing to associate an entity group with a list of other entity groups. The SingleGroupTypeReferenceBox may be defined as follows:

```
aligned(8) class
SingleGroupTypeReferenceBox(referenceType)
    extends Box(referenceType) {
        unsigned int(16) from_group_ID;
        unsigned int(16) reference_count;
        for (j=0; j<reference_count; j++) {
            unsigned int(16) to_group_ID;
        }
    }
``` where
from_group_ID contains the group_id of the entity group that refers to other entity groups.
reference_count is the number of references.
to_group_ID contains the group_id of the entity group referred to.

In other words, it is proposed a method of encapsulating media data in a file, wherein the method comprises:
    obtaining a first grouping data structure describing a first group of entities;
    obtaining a second grouping data structure describing a second group of entities;
    generating an association data structure comprising association information between the first grouping data structure and the second grouping data structure; and,
    embedding the first and second grouping data structures, the association data structure, and the media data in the file.

In an embodiment, the association data structure further comprises a reference type.

According to this alternative, the grouping_type 'pano' is associated with an EntityToGroupBox, the panorama entity group ('pano') then indicates an optional list of images (stored as items) and is optionally associated with groups of items, each group of items representing a bracketing set, that were captured in order to create a panorama. The panorama entity group 'pano' is associated with the groups of items representing the bracketing sets via a SingleGroupTypeReferenceBox of reference type 'base' in an ItemReferenceBox.

When an image sequence track is included in a 'pano' entity group (i.e., images are stored as samples in a track), there shall be only one entity_id present in the 'pano' entity group. An image sequence track may be included in a 'pano' entity group to indicate that it contains captured image sequence destined to form a panorama. An image sequence track present in the 'pano' entity group may contain other bracketing sample grouping (e.g., when the panorama capture is coupled with an auto-exposure bracketing to form an HDR panorama, a sample grouping with grouping_type 'aebr' can be defined to group and describe samples that belong to the same bracketing set).

Entities in the panorama entity group or samples in an image sequence track referred by a panorama entity group are listed in the panorama order. The panorama order used by the entity group or the group-to-group should be declared using a panorama item property 'pano' associated with the entity group or the group-to-group.

When images are stored as items, the panorama EntityToGroupBox can directly refer to other bracketing sets when the panorama capture is coupled with one or more bracketing (e.g., auto-exposure, focus, or white balance bracketing).

A panorama descriptive item property associated with the panorama entity group or group-to-group provides the parameters of the panorama (direction, type of bracketing if any). This item property should only be associated with an entity group 'pano' or group-to-group 'pano'.

The panorama descriptive item property can be defined as follows:

```
aligned(8) class PanoramaProperty
   extends ItemFullProperty('pano', version=0, flags=0) {
      unsigned int(8) panorama_direction;
      if (panorama_direction >= 4 && panorama_direction <= 5) { // grid
         unsigned int(8) rows_minus_one;
         unsigned int(8) columns_minus_one;
      }
}
``` where
   panorama_direction is an unsigned integer, for example on 8 bits, signaling the type of panorama used and the scanning order of input images in the panorama:
      0: left-to-right horizontal panorama
      1: right-to-left horizontal panorama
      2: bottom-to-top vertical panorama
      3: top-to-bottom vertical panorama
      4: grid panorama in raster scan order, i.e., rows and columns are organized from left-to-right and top-to-bottom starting from the top-left corner.
      5: grid panorama in continuous order, i.e., starting from the top-left corner, the first row is organized from left-to-right, then the second row is organized from right-to-left, the third row is organized from left-to-right and so on.
      other values are undefined.
   rows_minus_one is an unsigned integer that specifies the number of rows in the grid minus one.
   columns_minus_one is an unsigned integer that specifies the number of columns in the grid minus one.

The panorama descriptive item property can optionally include an additional attribute panorama_bracketing_type or a list of panorama_bracketing_type providing the 4CC of the grouping_type of the one or more bracketing sets that were coupled with the panorama capture. For instance, this panorama_bracketing_type allows the reader identifying in a track which samples form one single samples group or bracketing set corresponding to one single view among the multiple views that compose the panorama. From each group of samples, only one sample from the group or a merge of samples from this group (e.g., HDR composition of those samples) will be used to build one view to be composed with other views to build a complete panorama view.

Figure 4:
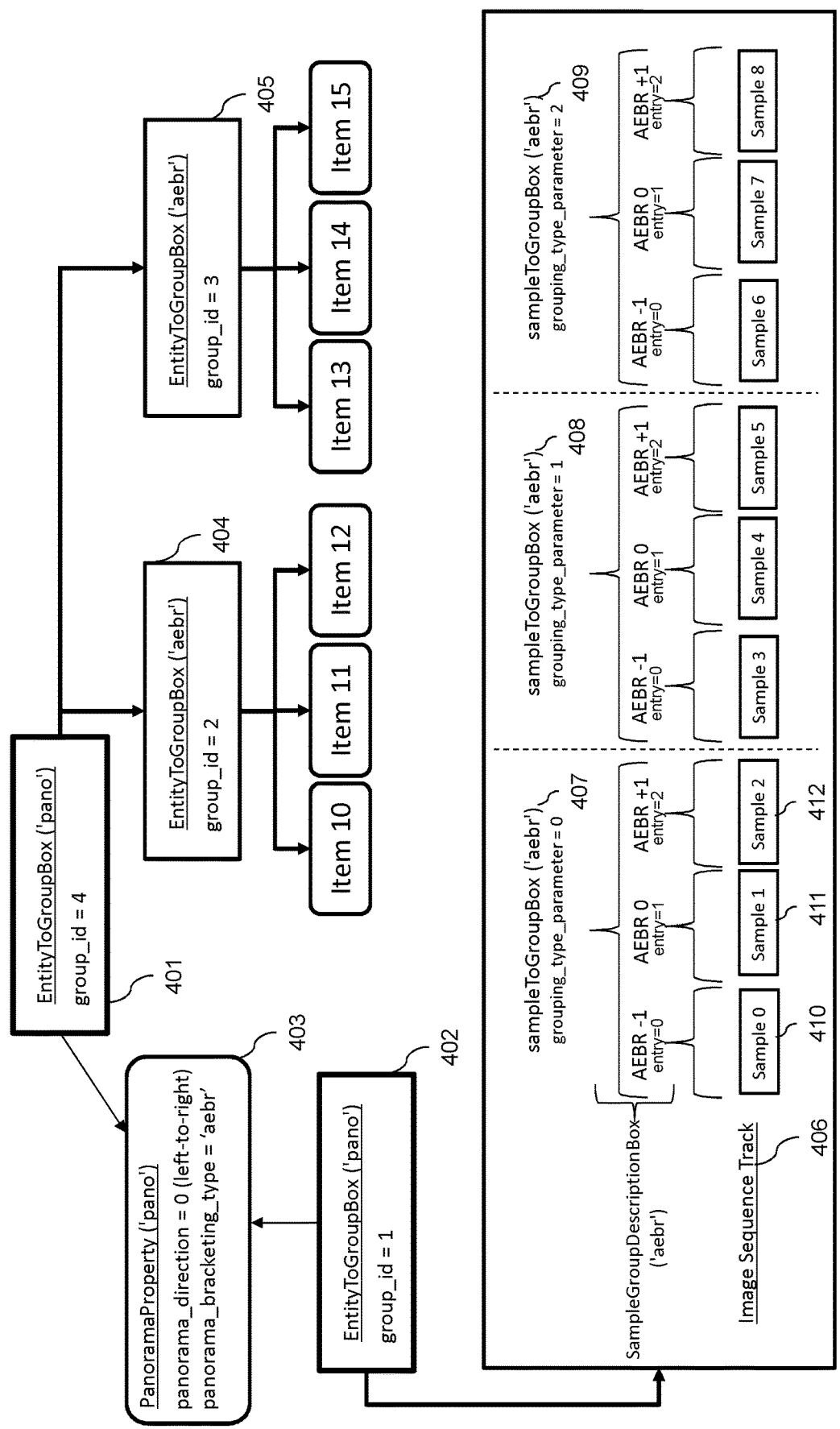
FIG. 4 illustrates the storage of a panorama in an entity group according to another embodiment of the invention.

FIG. 4 illustrates two examples of panorama described as an entity group.

In a first example, a first panorama is represented by a first entity group 401. In a second example, a second panorama is represented by a second entity group 402.

Both entity groups may refer to different item property PanoramaProperty('pano') boxes or, when they share same panorama properties, they can advantageously refer to a same item property PanoramaProperty('pano') 403 as above described.

The first panorama 401 is composed of and refers to several bracketing sets of items (e.g., auto-exposure bracketing sets 'aebr') represented by multiple entity groups 404 and 405.

The second panorama 402 is composed of a series of samples stored in one image sequence track 406 where the series of samples correspond to successive auto-exposure bracketing sets represented by several samples grouping 'aebr' 407, 408 and 409. E.g., the sample group 407 is composed of samples 410, 411 and 412. E.g. the sample 410 is associated with a sample group description entry 0 representing the auto-exposure value stop parameter=−1. The sample 412 is associated with a sample group description entry 2 representing the auto-exposure value stop parameter=+1

HEIF standard does not allow storing efficiently human-readable textual description of images or group of images including panorama. Human-readable textual description such as a name or title, a general description of the panorama, images or group of images, and list of tags or keywords associated with panorama, other images or group of images is useful for a user to organize, classify and retrieve those panorama, other images or group of images within an HEIF file, to display the content of the HEIF file, to create documents based on the content of the HEIF file or to share those panorama or other images or group of images with other users.

In some embodiments, additional human-readable label(s) may also be associated with any type of items or group of entities (e.g., representing a panorama according to above embodiments) to provide human-readable description of the content of each item or group of entities, for example a title, a general description, or tags.

For this purpose, an item property, for example called UserDescriptionProperty, may be defined as follows:
   Box type: 'udes'
   Property type: Descriptive item property
   Container: ItemPropertyContainerBox
   Mandatory (per item): No
   Quantity (per item): Zero or more The UserDescriptionProperty permits the association of items with a user-defined name, description and tags; there may be multiple such properties associated with an item or group of entities (possibly representing a panorama), which shall have different language codes. This allows associating different language alternatives with an item or group of entities.

The same UserDescriptionProperty may be associated with two different items or group of items if they share the same description. This allows saving memory by not duplicating same data information.

In addition, the following flags are allowed to be set in the box's flags:

0x000001 name-present
0x000002 description-present
0x000004 tags-present

When set, they indicate whether the associated name, description or tags strings are defined in the item property. This allows saving bytes in the item property definition when the corresponding field is not used, compared to an alternative consisting in defining empty strings.

```
aligned(8) class UserDescriptionProperty
    extends ItemFullProperty('udes', version = 0, flags = 0){
        utf8string lang;
        if (flags & name-present)         utf8string name;
        if (flags & description-present)  utf8string description;
        if (flags & tags-present)         utf8string tags;
}
```

Where
lang is a character string containing an RFC 5646 compliant language tag string, such as "en-US", "fr-FR", or "zh-CN", representing the language of the text contained in name, description and tags. When lang is empty, the language is unknown/undefined.
name is a null-terminated UTF-8 character string containing human readable name for the item or group of entities.
description is a null-terminated UTF-8 character string containing human readable description of the item or group of entities.
tags is a null-terminated UTF-8 character string containing comma-separated tags related to the item or group of entities.

The HEIF and MIAF file formats do not provide an efficient way of storing timing information for images and group of images including for panorama such as creation time or modification time. This timing information is useful for a user to organize, classify and retrieve panorama, or other images or group of images within an HEIF file, to display the content of the HEIF file, to create documents based on the content of the HEIF file or to share those panorama or other images or group of images with other users.

In some embodiments, additional item properties may be associated with any type of items or group of entities (e.g., representing a panorama according to above embodiments) for documenting their creation and modification times.

Some item properties, for example CreationTimeProperty and

ModificationTimeProperty, may be defined as follows:
Box type: 'crtt'
Property type: Descriptive item property
Container: ItemPropertyContainerBox
Mandatory (per item): No
Quantity (per item): At most one
Box type: 'mdft'
Property type: Descriptive item property
Container: ItemPropertyContainerBox
Mandatory (per item): No
Quantity (per item): At most one The CreationTimeProperty documents the creation time of the associated item or group of entities.
The ModificationTimeProperty documents the last modification time of the associated item or group of entities.

```
aligned(8) class CreationTimeProperty
    extends ItemFullProperty('crtt') {
        unsigned int(64) creation_time;
}
aligned(8) class ModificationTimeProperty
    extends ItemFullProperty('mdft') {
        unsigned int(64) modification_time;
}
```

Where
creation_time is an integer that declares the creation time of the item or group of entities (in microseconds since midnight, Jan. 1, 1904, in UTC time).
modification_time is an integer that declares the most recent time the item or group of entities was modified (in microseconds since midnight, Jan. 1, 1904, in UTC time).

Microseconds precision allows supporting capture time for high speed cameras with high frames per second rate. If higher precision is needed, a new version of the box can be defined with an additional 64-bit attribute (similarly to Network Time Protocol Version 4)

In alternatives, the UTC time may be counted since a different starting time (for instance another well-known Epoch times such as midnight, Jan. 1, 1970 or 2001, or any other arbitrary starting time well defined).

In another alternative, an additional attribute may be added, for instance as a signed integer, to provide the time zone that will allow retrieving the local time from the UTC time.

In another alternative, creation_time and modification_time may be expressed as a difference compared to a global reference time, also possibly by reference to a time scale, both declared in another box under top-level 'meta' box or another top-level box in the HEIF file. This would allow saving some bytes on creation_time and modification_time definitions (for instance using 32-bit integers rather than 64-bit integers).

In another alternative, ModificationTimeProperty includes additional attributes such as a human-readable label and optional versioning number as defined below. Multiple ModificationTimeProperty may be associated with an item or group of entities to keep track of modification history/versioning.
Box type: 'mdft'
Property type: Descriptive item property
Container: Item PropertyContainerBox
Mandatory (per item): No
Quantity (per item): Zero or more

```
aligned(8) class ModificationTimeProperty
    extends ItemFullProperty('mdft') {
        unsigned int(64) modification_time;
        unsigned int(16) major_version_number;
        unsigned int(16) minor_version_number;
        utf8string comment;
}
```

Where
modification_time is defined as described above.
major_version_number and minor_version_number are unsigned integer providing a major and minor version number.
comment gives a human-readable comment for the modification.

Optionally an additional attribute lang may provide the language of the text contained in comment similarly to UserDescriptionProperty.

Figure 5:
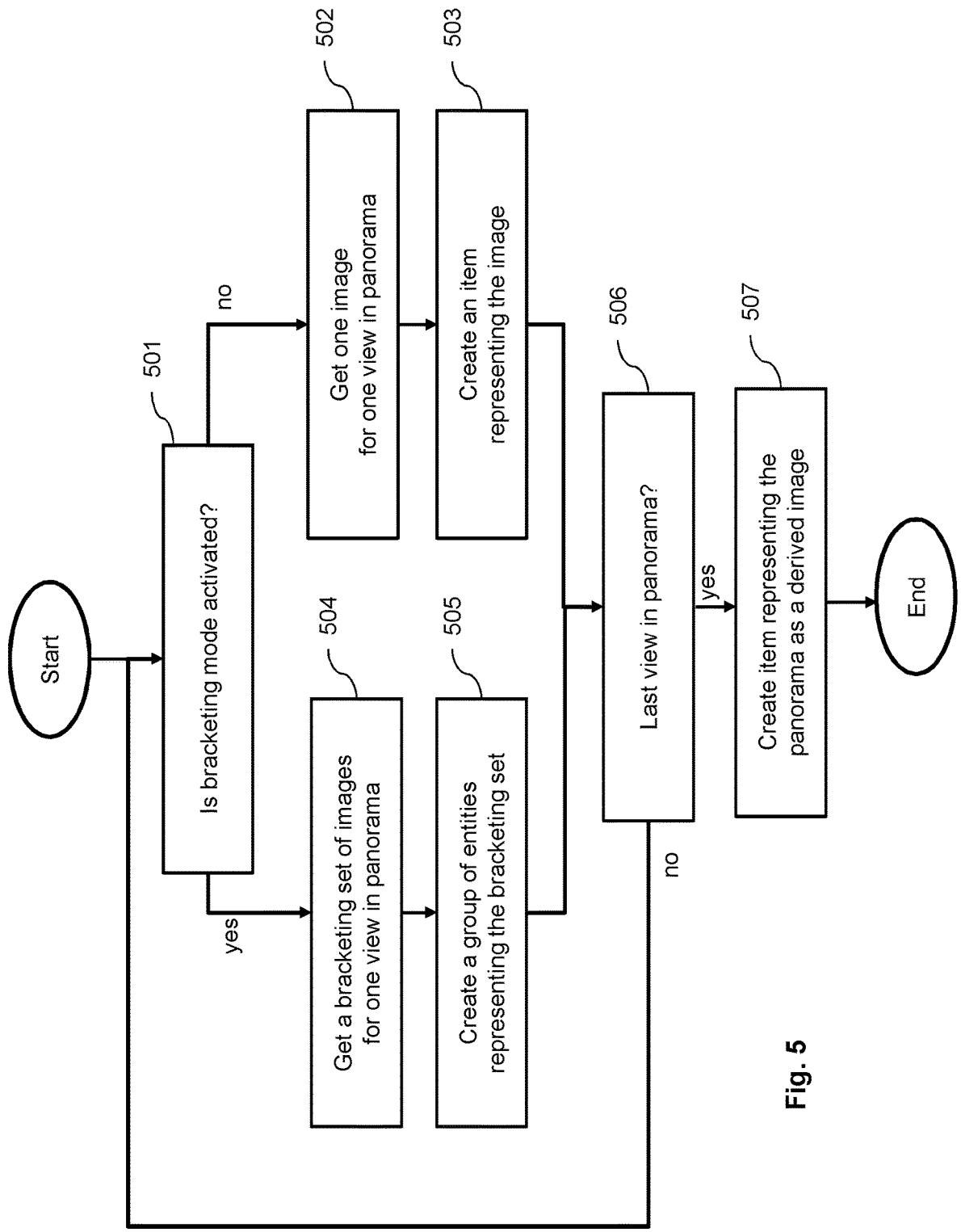
FIG. 5 illustrates the main steps of a process for encapsulating one or more images forming a panorama in one file using HEIF format according to some embodiments of the invention.

FIG. 5 illustrates the main steps of a process for encapsulating one or more images in one file using HEIF format. A computing device 600 (FIG. 6) may for instance apply this processing.

Several view captures are obtained by the device 600 to build a panorama view from a scene. Between each view capture, the device is moved according to a predetermined panorama direction, possibly up to 360° (e.g., forming a line or curve left-to-right or up-to-bottom, or forming a grid with a given scan order).

At step 501, for each view capture, the device determines if a bracketing mode is currently activated, i.e., whether multiple images shall be captured for a given view to form a bracketing set of images according to a given bracketing mode (e.g., auto-exposure bracketing, focus bracketing, white balance bracketing, super-resolution bracketing, depth-of-field bracketing, flash exposure bracketing, . . . ). The bracketing consists in taking a series of images, each image of the series being captured using a different value of a camera parameter. For instance, auto-exposure bracketing of three images may consist in a first image with a low exposure time, the second one with an intermediate exposure time, and a third one with a high exposure time.

If bracketing mode is activated at step 501, the device obtains a series of images at step 504 according to the bracketing mode parameters (number of images, image capture configuration parameters) configured in the device or selected by the user.

At step 505, each image of the series of images is encoded (for instance, using HEVC, JPEG, RAW or any other image coding format) and encapsulated in the HEIF file as a new coded image item. An EntityToGroupBox is defined referencing the series of coded image items with a grouping type corresponding to the bracketing mode. For instance, using the grouping type 'aebr' for an auto-exposure bracketing or 'fobr' for a focus bracketing. Optionally item properties are associated with each coded image item to describe bracketing parameter values of each image.

Alternatively, each image of the series of images is encoded and encapsulated in the HEIF file as a new sample in a track. And an EntityToGroupBox is defined referencing the track with a grouping type corresponding to the bracketing mode as described above. Sample grouping mechanism may be used to associate each sample with bracketing parameters values of each image (described in separate SampleGroupDescriptionEntry).

If bracketing mode is not activated at step 501, the device obtains one single image for a view at step 502, and encodes (in any image coding format) and encapsulates this image as a coded image item in the HEIF file at step 503.

At step 506, if the last capture view to form the panorama view is not reached, previous steps are repeated.

Finally, at step 507, a derived image is created according to one of the above-described embodiments, as a derived image item or a pre-derived coded image item, and encapsulated in the HEIF file to describe the panorama view referencing the EntityToGroupBoxes or image items created at steps 505 and 503.

If the panorama is created as a pre-derived coded image item, a panorama image is computed from the images captured at steps 502 and 504. The created panorama image is encoded (in any image coding format) and encapsulated as a pre-derived coded image item according to one of the above-described embodiments, and referencing the EntityToGroupBoxes or images created at steps 505 and 503.

Figure 6:
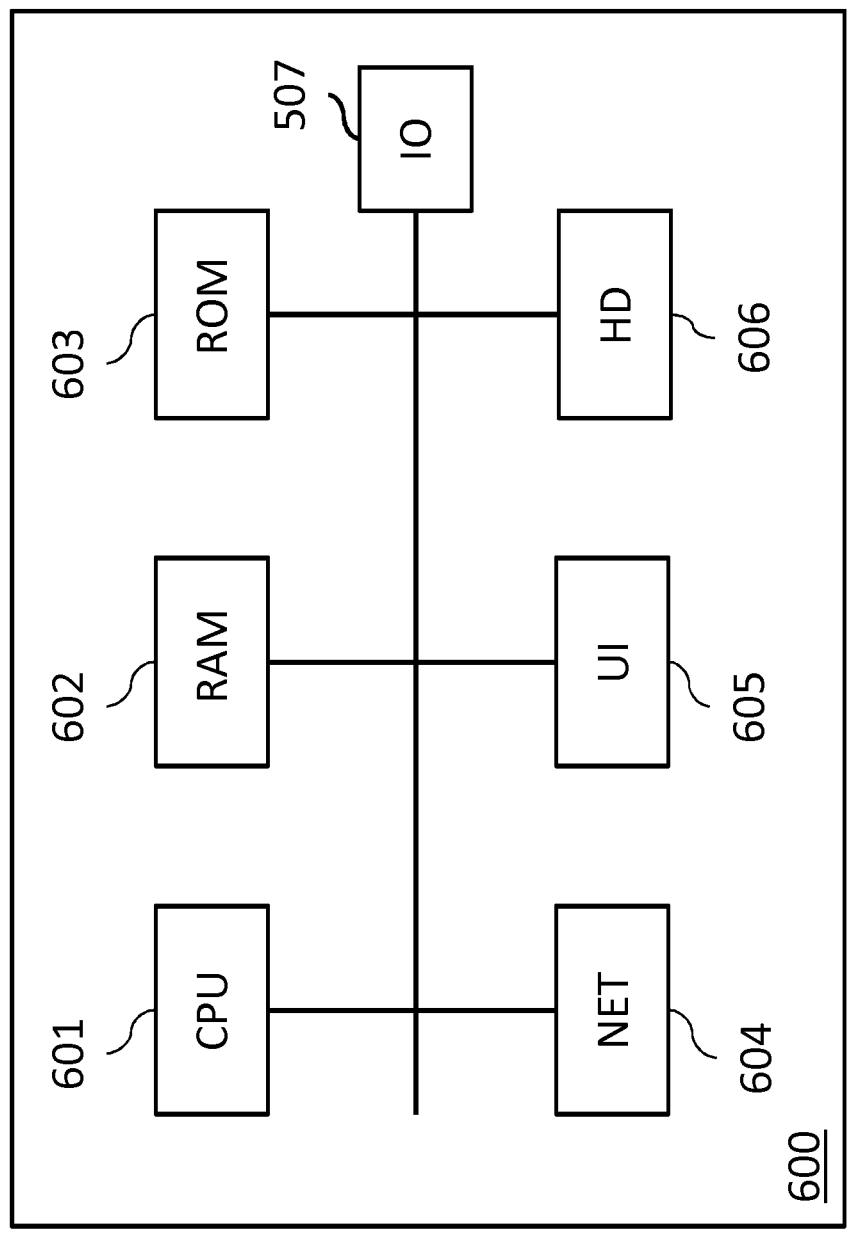
FIG. 6 is a schematic block diagram of a computing device for implementation of one or more embodiments of the invention.

FIG. 6 is a schematic block diagram of a computing device 600 for implementation of one or more embodiments of the invention. The computing device 600 may be a device such as a microcomputer, a workstation or a light portable device, for instance a mobile phone, tablet or still or video camera. The computing device 600 comprises a communication bus connected to:
- a central processing unit 601, such as a microprocessor, denoted CPU;
- a random access memory 602, denoted RAM, for storing the executable code of the method of embodiments of the invention as well as the registers adapted to record variables and parameters necessary for implementing the method according to embodiments of the invention, the memory capacity thereof can be expanded by an optional RAM connected to an expansion port, for example;
- a read-only memory 603, denoted ROM, for storing computer programs for implementing embodiments of the invention;
- a network interface 604 is typically connected to a communication network over which digital data to be processed are transmitted or received. The network interface 604 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 601;
- a user interface 605 may be used for receiving inputs from a user or to display information to a user;
- a hard disk 606 denoted HD may be provided as a mass storage device;
- an I/O module 607 may be used for receiving/sending data from/to external devices such as a video source or display.

The executable code may be stored either in read only memory 603, on the hard disk 606 or on a removable digital medium such as for example a disk. According to a variant, the executable code of the programs can be received by means of a communication network, via the network interface 604, in order to be stored in one of the storage means of the communication device 600, such as the hard disk 606, before being executed.

The central processing unit 601 is adapted to control and direct the execution of the instructions or portions of software code of the program or programs according to embodiments of the invention, which instructions are stored in one of the aforementioned storage means. After powering on, the CPU 601 is capable of executing instructions from main RAM memory 602 relating to a software application after those instructions have been loaded from the program ROM 603 or the hard-disc (HD) 606, for example. Such a software application, when executed by the CPU 601, causes the steps of the flowcharts of the invention to be performed.

Any step of the algorithms of the invention may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described herein above with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

Each of the embodiments of the invention described above can be implemented solely or as a combination of a plurality of the embodiments. Also, features from different embodiments can be combined where necessary or where the combination of elements or features from individual embodiments in a single embodiment is beneficial.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of encapsulating media data in an ISOBMFF-based media file, wherein the method comprises:
   generating an EntityToGroupBox describing a first group of entities identifying a plurality of images captured for generating a panorama, each entity of the first group being related to at least a portion of media data; and
   embedding the EntityToGroupBox and the media data in the media file,
   wherein an entity of the first group is a grouping structure describing a second group of entities identifying at least a part of the plurality of images, the second group of entities representing a bracketing set.

2. The method of claim 1, wherein the EntityToGroupBox characterizes a panorama entity group and comprises a grouping type equal to 'pano'.

3. The method of claim 1, wherein the grouping structure is an EntityToGroupBox.

4. The method of claim 1,
   wherein a panorama descriptive item property is associated with the first group,
   wherein the panorama descriptive item property provides parameters of the panorama.

5. The method of claim 4, wherein the panorama descriptive item property comprises at least one of:
   a panorama direction,
   an integer for specifying a number of rows in a grid panorama,
   an integer for specifying a number of columns in the grid panorama,
   wherein the grid panorama corresponds to a grid of images derived from the plurality of images.

6. The method of claim 4, wherein the panorama descriptive item property has a type equal to 'pano'.

7. The method of claim 1, wherein at least one entity in the first group of entities or in the second group of entities is associated with an item property comprising a timing information.

8. The method of claim 7, wherein the timing information indicates a creation time of the associated entity.

9. The method of claim 7, wherein the timing information indicates the last modification time of the associated entity.

10. The method of claim 1, wherein at least one entity of the second group is an image item.

11. The method of claim 1, wherein the grouping structure is a track.

12. The method of claim 11, wherein the track comprises samples, wherein the track is described by a SampleToGroupBox, wherein the SampleToGroupBox groups samples of the track belonging to a same bracketing set.

13. A non-transitory computer-readable storage medium storing instructions of a computer program for implementing a method according to claim 1.

14. A method of encapsulating media data in an ISOBMFF-based media file, wherein the method comprises:
   generating meta data comprising:
   (i) an Item-Property-Container-Box that comprises information of at least one of creation time or modification time for one or more entities or one or more groups of entities as item property; and
   (ii) an Item-Property-Association-Box that comprises information associating an identifier of the one or more entities or an identifier of the one or more groups of entities with an index of the item property included in the ItemPropertyContainerBox, each entity of the one or more entities or each entity of the one or more groups of entities being related to at least a portion of media data; and
   embedding the generated meta data and the media data in the media file.

15. A device for encapsulating media data in an ISOBMFF-based media file, wherein the device comprises:
   a processor and a memory storing executable instructions which, when executed by the processor, cause the device to perform operations including:
   generating an EntityToGroupBox describing a first group of entities identifying a plurality of images captured for generating a panorama, each entity of the first group being related to at least a portion of media data; and
   embedding the EntityToGroupBox and the media data in the media file,
   wherein an entity of the first group is a grouping structure describing a second group of entities identifying at least a part of the plurality of images, the second group of entities representing a bracketing set.

16. A device for encapsulating media data in an ISOBMFF-based media file, wherein the device comprises:
   a processor and a memory storing executable instructions which, when executed by the processor, cause the device to perform operations including:
   generating meta data including
   (i) an ItemPropertyContainerBox that comprises information of at least one of creation time or modification time for one or more entities or one or more groups of entities as item property; and
   (ii) an Item PropertyAssociationBox that comprises information associating an identifier of the one or more entities or an identifier of the one or more groups of entities with an index of the item property included in the ItemPropertyContainerBox, each entity of the one or more entities or each entity of the one or more groups of entities being related to at least a portion of media data; and embedding the generated meta data and the media data in the media file.

17. A device for reading media data in an ISOBMFF-based media file, wherein the device comprises:

a processor and a memory storing executable instructions which, when executed by the processor, cause the device to perform operations including:

obtaining, from the media file, an EntityToGroupBox describing a first group of entities identifying a plurality of images captured for generating a panorama, each entity of the first group being related to at least a portion of media data; and obtaining, from the media file, media data to which each entity of the first group is related to, wherein an entity of the first group is a grouping structure describing a second group of entities identifying at least a part of the plurality of images, the second group of entities representing a bracketing set.

18. A device for reading media data in an ISOBMFF-based media file, wherein the device comprises:

a processor and a memory storing executable instructions which, when executed by the processor, cause the device to perform operations including:

obtaining, from the media file, meta data comprising:

(i) an Item-Property-Container-Box that comprises information of at least one of creation time or modification time for one or more entities or one or more groups of entities as item property; and (ii) an Item-Property-Association-Box that comprises information associating an identifier of the one or more entities or an identifier of the one or more groups of entities with an index of the item property included in the ItemPropertyContainerBox, each entity of the one or more entities or each entity of the one or more groups of entities being related to at least a portion of media data; and obtaining, from the media file, the media data.

19. A method of reading media data in an ISOBMFF-based media file, wherein the method comprises:

obtaining, from the media file, an EntityToGroupBox describing a first group of entities identifying a plurality of images captured for generating a panorama, each entity of the first group being related to at least a portion of media data; and obtaining, from the media file, media data to which each entity of the first group is related to, wherein an entity of the first group is a grouping structure describing a second group of entities identifying at least a part of the plurality of images, the second group of entities representing a bracketing set.

20. A non-transitory computer-readable storage medium storing instructions of a computer program for implementing a method according to claim 19.

21. A method of reading media data in an ISOBMFF-based media file, wherein the method comprises:

obtaining, from the media file, meta data comprising:

(i) an Item-Property-Container-Box that comprises information of at least one of creation time or modification time for one or more entities or one or more groups of entities as item property; and (ii) an Item-Property-Association-Box that comprises information associating an identifier of the one or more entities or an identifier of the one or more groups of entities with an index of the item property included in the ItemPropertyContainerBox, each entity of the one or more entities or each entity of the one or more groups of entities being related to at least a portion of media data; and obtaining, from the media file, the media data.

22. A non-transitory computer-readable storage medium storing instructions of a computer program for implementing a method according to claim 21.

* * * * *